(12) United States Patent
Matsumura et al.

(10) Patent No.: US 6,306,928 B1
(45) Date of Patent: Oct. 23, 2001

(54) WATER RESISTANT INK COMPOSITIONS

(75) Inventors: Kazuyuki Matsumura; Masanao Kamei; Masaaki Yamaya; Akira Yamamoto, all of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/261,957

(22) Filed: Mar. 3, 1999

(30) Foreign Application Priority Data

Mar. 3, 1998 (JP) .................................................. 10-067936

(51) Int. Cl.$^7$ .......................... C08G 77/38; C08G 65/04; C08G 77/14; C08G 77/26; C08L 83/06; C08L 83/08; C09D 11/10; C08F 283/12

(52) U.S. Cl. .............................. 523/160; 528/38; 528/39; 528/421; 525/476; 525/477

(58) Field of Search ..................... 523/160, 161; 528/32, 38, 39, 405, 421; 525/403, 409, 476, 477; 556/458, 413; 549/214

(56) References Cited

U.S. PATENT DOCUMENTS

| | | | |
|---|---|---|---|
| 3,961,977 | * | 6/1976 | Koda et al. ...................... 106/287.11 |
| 3,975,554 | * | 8/1976 | Kummins et al. ........................ 427/8 |
| 4,250,074 | * | 2/1981 | Foscante et al. ...................... 523/428 |
| 4,378,389 | * | 3/1983 | Maruyama et al. .................. 427/387 |
| 4,385,158 | * | 5/1983 | Mikami et al. ....................... 525/476 |
| 4,543,404 | * | 9/1985 | Sugano et al. .......................... 528/26 |
| 4,562,237 | * | 12/1985 | Okuno et al. ........................... 528/17 |
| 4,727,168 | * | 2/1988 | Yoshino et al. ....................... 556/408 |
| 4,751,114 | * | 6/1988 | Homma et al. .................... 427/407.1 |
| 5,424,383 | * | 6/1995 | Kimura et al. ......................... 528/12 |
| 5,629,400 | | 5/1997 | Standke et al. . |
| 5,935,311 | * | 8/1999 | Matsumura et al. .............. 106/31.43 |

FOREIGN PATENT DOCUMENTS

| | | |
|---|---|---|
| 012835 | 7/1980 | (EP) . |
| 819744 | 1/1989 | (EP) . |
| 0671450 * | 9/1993 | (EP) . |
| 716127 | 6/1996 | (EP) . |
| 5525432 * | 8/1978 | (JP) . |
| 08120238 * | 5/1996 | (JP) . |

OTHER PUBLICATIONS

English Translation of JP 08120238, 1996.*
Copy of European Search Report of 99301599.9–2102–Mailed Jun. 23, 1999.
Derwent Publications, Ltd., Section Ch, Week 9819—XP002105586 (1996).

* cited by examiner

*Primary Examiner*—Vasu Jagannathan
*Assistant Examiner*—Callie Shosho
(74) *Attorney, Agent, or Firm*—Millen, White, Zelano & Branigan, P.C.

(57) ABSTRACT

Water resistant ink compositions comprising (I) a water-soluble dye compound and/or an organic pigment compound; (II) an organosilicon compound obtained by hydrolyzing a mixture of (A) a hydrolyzable silane obtained by reacting a specific aminated organic group-bearing hydrolyzable silane with an organic monoepoxy compound, or a partial hydrolyzate thereof, and (B) a specific hydrolyzable silane or a partial hydrolyzate thereof; and (III) water have excellent water resistance, good storage and shelf stability, good ink discharge stability, and outstanding color stability. These ink compositions are particularly suitable for use as ink-jet printer inks.

32 Claims, No Drawings

WATER RESISTANT INK COMPOSITIONS

BACKGROUND OF THE INVENTION

1. Field of the Invention

The present invention relates to water resistant ink compositions which are highly suitable for use in recording methods that employ water-based inks, especially ink-jet printing. These compositions are water resistant in that after having been printed onto a recording medium and dried, no loss in quality occurs whatsoever of the printed image even upon accidental exposure to water or beverages, and also have excellent color stability.

2. Prior Art

Ink-jet printing makes use of a number of different ink discharge techniques to form droplets of ink and deposit some or all of the droplets on a recording medium such as paper ("ink" being understood here to refer to a recording liquid). Outstanding techniques include electrostatic attraction, the application of mechanical vibrations or changes to the ink using a piezoelectric element, and thermal bubble formation from the ink combined with use of the resulting pressure. These ink-jet printing methods are in wide use today because they generate little noise and enable high-speed, multicolor printing to be carried out.

The inks commonly used in ink-jet printing contain water as the main component to ensure safety and good recording characteristics. Polyhydric alcohols are also included to prevent clogging of the nozzles in the ink-jet printing system and to enhance discharge stability.

However, further improvement needs to be made in the properties of ink compositions in order to keep pace with the better performance and more widespread use recently of ink-based recording systems and related technology. This need for improvement is particularly acute with regard to the water resistance of inks. The past few years have seen a very rapid rise in the use of ink-jet printers, both in the office and at home. However, in the home and office environment, there is a greater chance of printed matter coming into contact with water or beverages such as coffee or soda. Under such conditions, it is essential that the ink be water resistant.

Yet, very few if any of the water-soluble inks with good color development currently on the market are water resistant. When a printed image comes into contact with water, for instance, the image is almost always ruined by color bleeding or the like. Because both the dye itself and the polyhydric alcohol added to improve the discharge stability of the ink are water-soluble, direct contact of the printed image with water allows these components to dissolve out into the water, destroying the quality of the image.

Of course, the polyhydric alcohol component of a dye-containing ink may be eliminated, but the result is a loss in discharge stability.

An attempt to confer reactivity on the dye itself so that it is bound to the substrate has been reported in Shikizai, 67, No. 6, 356–361 (1994). The dye is made reactive by introducing alkoxysilyl groups onto the dye molecule. Unfortunately, water-soluble dyes often have polar groups such as —SO$_3$Na, —NH$_2$, and —CN incorporated therein to confer water solubility. These polar groups tend to react with the alkoxysilyl groups, making it difficult to successfully introduce alkoxysilyl groups. Moreover, the resulting dye has a poor stability in aqueous solutions, and is also unduly expensive.

According to another method, described in Shikizai, 66, No. 9, 517–522 (1993), a dye is added to tetraethoxysilane or methyltriethoxysilane to form a sol, which is applied to a glass substrate, whereby the dye is immobilized. However, because this type of sol normally gels immediately upon addition to a basic water-based ink, it cannot be used in water-based inks.

Silicone compounds are commonly used as additives for imparting water resistance. While these do indeed confer excellent water resistance in a solvent system, their stability in water is rather poor. At best, they are somewhat stable under weakly acidic conditions, but generally lose all stability when the system is even mildly alkaline. Given that water-soluble dyes are most often alkaline, silicone compounds are of no use in such a system.

Water-soluble polyamines have been used in quite a few cases recently to provide dyes with water resistance. However, one drawback has been intense color changes which alter the color tone of the dye, possibly due to the decomposition of azo groups in the dye on account of the reactivity and basicity of the amino groups, and especially the primary amino groups, on the polyamine.

JP-A 279678/1994 describes a water-based surface treatment composition comprising as a primary component either the hydrolyzate of the product obtained by reacting an aminotrialkoxysilane with an organic compound that reacts with the amino group on the silane, or the product obtained by further reacting this hydrolyzate with an organometallic compound such as a tetraalkoxysilane. Amino groups are blocked to some extent by using polydiglycidyl compounds as the blocking agent. Although the blocking of amino groups limits changes in the color tone to some degree, the use of polydiglycidyl compounds destabilizes the liquid itself, such as by making it subject to gelation. This method also calls for the addition of an anionic surfactant as the stabilizer, which can be detrimental to the water resistance. Another problem has been the instability of this liquid under alkaline conditions, making it of little use as an additive in water-soluble ink compositions.

SUMMARY OF THE INVENTION

It is therefore an object of the present invention to provide ink compositions highly suitable for use in recording methods that employ water-based inks, especially ink-jet printing, which ink compositions have both excellent water resistance, enabling images printed therewith to be completely resistant to attack by water, as well as excellent color stability.

We have found that ink compositions which achieve this and other objects can be obtained by blending (I) a water-soluble dye compound or an organic pigment compound or both, (II) an organosilicon compound (C) or (D) as defined below, and (III) water in a specific ratio.

The organosilicon compound (C) is obtained by hydrolyzing, in water or an organic solvent containing at least the amount of water required for hydrolysis, a mixture comprising (A) 100 parts by weight of a hydrolyzable silane obtained by reacting (i) an aminated organic group-bearing hydrolyzable silane of the general formula:

$$YR^1{}_mSiR^2{}_{3-m} \qquad (1)$$

wherein $R^1$ is an unsubstituted or substituted monovalent hydrocarbon group having 1 to 8 carbons, $R^2$ is an alkoxy or acyloxy group having 1 to 4 carbons, Y is an aminated organic group, and m is 0 or 1, with (ii) an organic monoepoxy compound in an amount corresponding to from 0.01 to 20 moles of epoxy groups per mole of amino groups in the hydrolyzable silane, or a partial hydrolyzate thereof, and (B) 5 to 200 parts by weight of a hydrolyzable silane of the general formula:

$$R^3{}_n SiR^4{}_{4-n} \quad (2)$$

wherein $R^3$ is an unsubstituted or a non-nitrogenous substituted monovalent hydrocarbon group having 1 to 8 carbons, $R^4$ is an alkoxy or acyloxy group having 1 to 4 carbons, and n is 0, 1 or 2, or a partial hydrolyzate thereof.

The organosilicon compound (D) is obtained by reacting a hydrolyzate afforded by the hydrolysis, in water or an organic solvent containing at least the amount of water required for hydrolysis, of a mixture comprising (i) 100 parts by weight of an aminated organic group-bearing hydrolyzable silane of above general formula (1), or a partial hydrolyzate thereof, and (B) 5 to 200 parts by weight of a hydrolyzable silane of above general formula (2), or a partial hydrolyzate thereof, with (ii) an organic monoepoxy compound in an amount corresponding to from 0.01 to 20 moles of epoxy groups per mole of amino groups in the hydrolyzate obtained from silanes (i) and (B).

These ink compositions are very well suited for use in recording methods that employ water-based inks, especially ink-jet printing, and have such outstanding water resistance that images printed with these inks are completely resistant to attack by water. Moreover, they are not susceptible to changes in color tone due to the deleterious effects of amino groups, and thus have excellent color stability.

Accordingly, the present invention provides water resistant ink compositions comprising (I) 10 parts by weight of one or both a water-soluble dye compound and an organic pigment compound, (II) 2 to 60 parts by weight of above-described organosilicon compound (C) or (D), and (III) 30 to 10,000 parts by weight of water.

DETAILED DESCRIPTION OF THE INVENTION

The water-soluble dye compound serving as component (I) in the invention may be any compound used as a dye component in ordinary water-soluble inks, although compounds known and used as coloring ingredients for imparting colors such as black, cyan, magenta, or yellow are preferred. Illustrative, non-limiting examples include yellow dyes such as Acid Yellow 17, Acid Yellow 23, Acid Yellow 73, Acid Yellow 79, and Direct Yellow 86; magenta dyes such as Acid Red 1, Acid Red 8, Acid Red 14, Acid Red 37, Acid Red 52, Acid Red 87, Acid Red 92, Acid Red 103, Acid Red 289, and Reactive Red 4; cyan dyes such as Acid Blue 9, Acid Blue 87, Acid Blue 92, Reactive Blue 15, and Direct Blue 86; and black dyes such as Acid Black 2, Direct Black 22, Direct Black 154, and Food Black 2.

These dyes are commonly modified with sodium sulfonate to confer water solubility. The modified dyes are almost always alkaline when dissolved in water, and they can be very effectively used.

Suitable examples of organic pigments which may be used in this invention include Aniline Black, Fast Yellow, Disazo Yellow, Permanent Orange, Risol Red, Lake Red C, Permanent Red 2B, Brilliant Carmine 6B, Carmine 3B, Cobalt Violet, Methyl Violet Lake, Phthalocyanine Blue, Fast Sky Blue, and Phthalocyanine Green.

The organosilicon compound (C) or (D) used as component (II) in this invention imparts water resistance to the inventive ink composition. Surprisingly, this component is readily soluble in aqueous solutions, and yet remains highly stable even in alkaline aqueous solutions. Moreover, because it does not attack chromophores such as azo radicals in the dye, the color tone remains unaffected by it for a long period of time.

Organosilicon compound (C) can be obtained by hydrolyzing a mixture comprising (A) a hydrolyzable silane obtained by reacting
  (i) an aminated organic group-bearing hydrolyzable silane of the general formula:

$$YR^1{}_m SiR^2{}_{3-m} \quad (1)$$

wherein $R^1$ is an unsubstituted or substituted monovalent hydrocarbon group having 1 to 8 carbons, $R^2$ is an alkoxy or acyloxy group having 1 to 4 carbons, Y is an aminated organic group, and m is 0 or 1, with (ii) an organic monoepoxy compound, or a partial hydrolyzate thereof; and (B) a hydrolyzable silane of the general formula:

$$R^3{}_n SiR^4{}_{4-n} \quad (2)$$

wherein $R^3$ is an unsubstituted or a non-nitrogenous substituted monovalent hydrocarbon group having 1 to 8 carbons, $R^4$ is an alkoxy or acyloxy group having 1 to 4 carbons, and n is 0, 1 or 2, or a partial hydrolyzate thereof.

Organosilicon compound (D) can be obtained by reacting: a hydrolyzate afforded by the hydrolysis of a mixture comprising (i) an aminated organic group-bearing hydrolyzable silane of above general formula (1), or a partial hydrolyzate thereof, and (B) a hydrolyzable silane of above general formula (2), or a partial hydrolyzate thereof, with (ii) an organic monoepoxy compound in an amount corresponding to from 0.01 to 20 moles of epoxy groups per mole of amino groups in said hydrolyzate obtained from silanes (i) and (B).

First, organosilicon compound (C) used as component (II) in the water resistant ink compositions according to one aspect of the invention is described. The hydrolyzable silane (A) described above is a component used for the purpose of rendering the system water-soluble. One or more hydrolyzable silanes of this type may be suitably selected and used to impart water solubility to the target organosilicon compound. A partial hydrolyzate of the hydrolyzable silane (A) may also be used for this purpose.

This hydrolyzable silane (A) can be obtained by the reaction of (i) an aminated organic group-bearing hydrolyzable silane of the general formula:

$$YR^1{}_m SiR^2{}_{3-m} \quad (1)$$

with (ii) an organic monoepoxy compound.

In above formula (1), $R^1$ is an unsubstituted or substituted monovalent hydrocarbon group having 1 to 8 carbons, including unsubstituted monovalent hydrocarbon groups such as alkyl, alkenyl, aryl, and aralkyl groups; and substituted monovalent hydrocarbon groups in which some or all of the hydrogen atoms on the foregoing groups have been substituted with halogen atoms, such as halogenated alkyl groups. Preferably, the substituents contain no nitrogen atoms. Illustrative examples of suitable monovalent hydrocarbon groups include —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)CH$_3$, —C(CH$_3$)$_3$, —C$_6$H$_5$, and —C$_6$H$_{13}$.

R$^2$ is an alkoxy or acyloxy group having 1 to 4 carbons, illustrative examples of which include —OCH$_3$, —OCH$_2$CH$_3$, —OCH$_2$CH$_2$CH$_3$, —OCH(CH$_3$)$_2$, —OCH$_2$CH$_2$CH$_2$CH$_3$, —OCH(CH$_3$)CH$_2$CH$_3$, —OCH$_2$CH(CH$_3$)CH$_3$, —OC(CH$_3$)$_3$, —OCOCH$_3$, and —OCOCH$_2$CH$_3$.

Y in above formula (1) is an aminated organic group exemplified by groups of the formula:

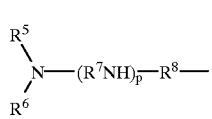

(3)

wherein R$^5$ and R$^6$ are each independently hydrogen or a monovalent hydrocarbon group having 1 to 8 carbons, R$^7$ and R$^8$ are each independently a divalent hydrocarbon group having 1 to 8 carbons and may be the same or different, and p is 0 or an integer from 1 to 3. Here, the monovalent hydrocarbon groups having 1 to 8 carbons are exemplified by the same groups as mentioned above for R$^1$, and the divalent hydrocarbon groups having 1 to 8 carbons are exemplified by alkylene groups.

Illustrative examples of Y include
H$_2$NCH$_2$—,
H(CH$_3$)NCH$_2$—,
H$_2$NCH$_2$CH$_2$—,
H(CH$_3$)NCH$_2$CH$_2$—,
H$_2$NCH$_2$CH$_2$CH$_2$—,
H(CH$_3$)NCH$_2$CH$_2$CH$_2$—,
(CH$_3$)$_2$NCH$_2$CH$_2$CH$_2$—,
H$_2$NCH$_2$CH$_2$NHCH$_2$CH$_2$CH$_2$—,
H(CH$_3$)NCH$_2$CH$_2$NHCH$_2$CH$_2$CH$_2$—,
(CH$_3$)$_2$NCH$_2$CH$_2$NHCH$_2$CH$_2$CH$_2$—,
H$_2$NCH$_2$CH$_2$NHCH$_2$CH$_2$NHCH$_2$CH$_2$CH$_2$—, and
H(CH$_3$)NCH$_2$CH$_2$NHCH$_2$CH$_2$NHCH$_2$CH$_2$CH$_2$—.
Of these, H$_2$NCH$_2$CH$_2$CH$_2$—, H$_2$NCH$_2$CH$_2$NHCH$_2$CH$_2$CH$_2$—, and H$_2$NCH$_2$CH$_2$NHCH$_2$CH$_2$NHCH$_2$CH$_2$CH$_2$— are preferred.

The letter m in formula (1) is 0 or 1, and preferably 0.

Illustrative examples of the hydrolyzable silane (A) containing an aminated organic group of above formula (1) include
H$_2$NCH$_2$Si(OCH$_3$)$_3$,
H$_2$NCH$_2$Si(OCH$_2$CH$_3$)$_3$,
H$_2$NCH$_2$SiCH$_3$(OCH$_3$)$_2$,
H$_2$NCH$_2$SiCH$_3$(OCH$_2$CH$_3$)$_2$,
H$_2$NCH$_2$CH$_2$Si(OCH$_3$)$_3$,
H$_2$NCH$_2$CH$_2$Si(OCH$_2$CH$_3$)$_3$,
H$_2$NCH$_2$CH$_2$SiCH$_3$(OCH$_3$)$_2$,
H$_2$NCH$_2$CH$_2$SiCH$_3$(OCH$_2$CH$_3$)$_2$,
H$_2$NCH$_2$CH$_2$CH$_2$Si(OCH$_3$)$_3$,
H$_2$NCH$_2$CH$_2$CH$_2$Si(OCH$_2$CH$_3$)$_3$,
H$_2$NCH$_2$CH$_2$CH$_2$SiCH$_3$(OCH$_3$)$_2$,
H$_2$NCH$_2$CH$_2$CH$_2$SiCH$_3$(OCH$_2$CH$_3$)$_2$,
H(CH$_3$)NCH$_2$CH$_2$CH$_2$Si(OCH$_3$)$_3$,
H(CH$_3$)NCH$_2$CH$_2$CH$_2$Si(OCH$_2$CH$_3$)$_3$,
H(CH$_3$)NCH$_2$CH$_2$CH$_2$SiCH$_3$(OCH$_3$)$_2$,
H(CH$_3$)NCH$_2$CH$_2$CH$_2$SiCH$_3$(OCH$_2$CH$_3$)$_2$,
H$_2$NCH$_2$CH$_2$NHCH$_2$CH$_2$CH$_2$Si(OCH$_3$)$_3$,
H$_2$NCH$_2$CH$_2$NHCH$_2$CH$_2$CH$_2$Si(OCH$_2$CH$_3$)$_3$,
H$_2$NCH$_2$CH$_2$NHCH$_2$CH$_2$CH$_2$SiCH$_3$(OCH$_3$)$_2$,
H$_2$NCH$_2$CH$_2$NHCH$_2$CH$_2$CH$_2$SiCH$_3$(OCH$_2$CH$_3$)$_2$,
H(CH$_3$)NCH$_2$CH$_2$NHCH$_2$CH$_2$CH$_2$Si(OCH$_3$)$_3$,
H(CH$_3$)NCH$_2$CH$_2$NHCH$_2$CH$_2$CH$_2$Si(OCH$_2$CH$_3$)$_3$,
H(CH$_3$)NCH$_2$CH$_2$NHCH$_2$CH$_2$CH$_2$SiCH$_3$(OCH$_3$)$_2$,
H(CH$_3$)NCH$_2$CH$_2$NHCH$_2$CH$_2$CH$_2$SiCH$_3$(OCH$_2$CH$_3$)$_2$,
H$_2$NCH$_2$CH$_2$NHCH$_2$CH$_2$NHCH$_2$CH$_2$CH$_2$Si(OCH$_3$)$_3$,
H$_2$NCH$_2$CH$_2$NHCH$_2$CH$_2$NHCH$_2$CH$_2$CH$_2$Si(OCH$_2$CH$_3$)$_3$,
H$_2$NCH$_2$CH$_2$NHCH$_2$CH$_2$NHCH$_2$CH$_2$CH$_2$SiCH$_3$(OCH$_3$)$_2$, and
H$_2$NCH$_2$CH$_2$NHCH$_2$CH$_2$NHCH$_2$CH$_2$CH$_2$SiCH$_3$(OCH$_2$CH$_3$)$_2$.

Of these, the following are preferred.
H$_2$NCH$_2$CH$_2$CH$_2$Si(OCH$_3$)$_3$,
H$_2$NCH$_2$CH$_2$CH$_2$Si(OCH$_2$CH$_3$)$_3$,

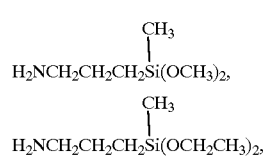

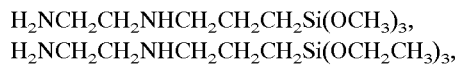

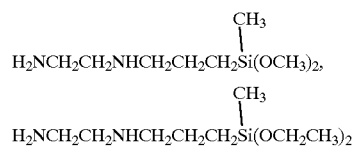

The organic monoepoxy compound (ii) which is reacted with the above-described aminated organic group-bearing hydrolyzable silane (i) may be any suitable organic compound having only one epoxy group on the molecule. Organic compounds containing two or more epoxy groups per molecule may create an undesirable gel state with the aminated hydrolyzable silanes, adversely affecting the storage stability of the liquid.

Organic monoepoxy compounds of the following general formula (4) are especially preferred.

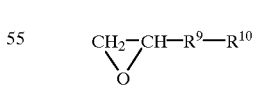

(4)

In the formula, R$^9$ is a divalent organic group, preferably a straight or branched divalent hydrocarbon group, especially alkylene or alkenylene, having 1 to 25 carbons, and especially 1 to 10 carbons, which may have one or more intervening oxygen atoms on the chain. Examples include alkylene, oxyalkylene, polyoxyalkylene, alkenylene and oxyalkenylene groups. R$^{10}$ is a hydroxyl group, an unsubstituted or substituted alkenyl group, a (meth)acryloxy group, a halogen atom, or —SiR$^{11}$$_3$ (wherein each R$^{11}$ moiety is independently an alkyl, alkoxy, or acyloxy group having 1 to 4 carbons). The unsubstituted or substituted alkenyl preferably has 2 to 4 carbons. Exemplary substituted alkenyl groups include halogenated alkenyl groups.

Illustrative examples of the monoepoxy compound include the following:

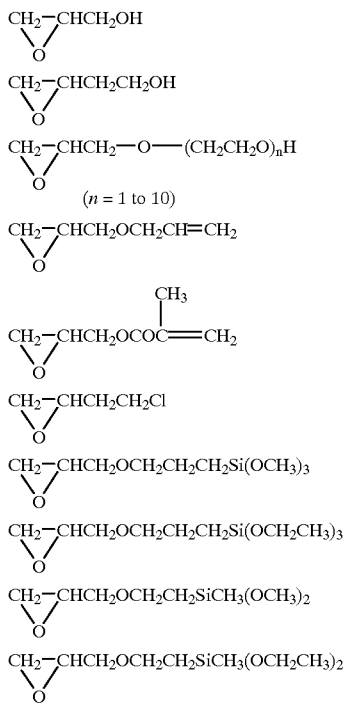

This organic monoepoxy compound (ii) is added to the aminated organic group-bearing hydrolyzable silane (i) in an amount which corresponds to a range of 0.01 to 20 moles, and preferably 0.1 to 10 moles, of epoxy groups per mole of nitrogen atoms contained in the aminated organic group-bearing hydrolyzable silane. An amount of epoxy groups lower than 0.01 mole is detrimental to the color stability, whereas an amount greater than 20 moles is unnecessarily expensive and results in a poor storage stability.

Component (A) of the invention is obtained by mixing predetermined amounts of the above-described aminated organic group-bearing hydrolyzable silane (i) and the organic monoepoxy compound (ii), then reacting these under heat, such as by the reaction shown below, thus modifying the hydrolyzable silane by blocking active hydrogens thereon with the organic monoepoxy compound. Excellent color stability can be obtained by blocking, in particular, a primary amino group, which has a large negative impact on the color tone. While this does lower the water solubility attributable to the amino groups, the actual decline in solubility is minimal on account of the compensatory effect upon water solubility by the hydroxyl groups generated in the epoxy group ring-opening reaction.

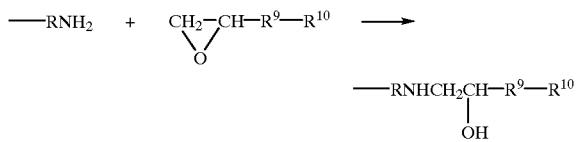

The hydrolyzable silane (B) which is used in admixture with the above-described hydrolyzable silane (A) or a partial hydrolyzate thereof has the general formula (2).

$$R^3{}_n SiR^4{}_{4-n} \quad (2)$$

In the formula, $R^3$ is an unsubstituted or a non-nitrogenous substituted monovalent hydrocarbon group having 1 to 8 carbons, $R^4$ is an alkoxy or acyloxy group having 1 to 4 carbons, and n is 0, 1 or 2. This hydrolyzable silane (B) may be used singly or as a combination of two or more thereof. Partial hydrolyzates of this silane may also be employed.

The unsubstituted or substituted monovalent hydrocarbon groups of 1 to 8 carbons represented by $R^3$ in formula (2) are exemplified by the same groups as for $R^1$. Suitable examples of $R^3$ include —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)CH_3$, —$C(CH_3)_3$, —$C_6H_5$, and —$C_6H_{13}$.

$R^4$ is an alkoxy or acyloxy group having 1 to 4 carbons. Illustrative examples include —$OCH_3$, —$OCH_2CH_3$, —$OCH_2CH_2CH_3$, —$OCH(CH_3)_2$, —$OCH_2CH_2CH_2CH_3$, —$OCH(CH_3)CH_2CH_3$, —$OCH_2CH(CH_3)CH_3$, —$OC(CH_3)_3$, —$OCOCH_3$, and —$OCOCH_2CH_3$.

The letter n in formula (2) is 0, 1, or 2.

Exemplary hydrolyzable silanes (B) having formula (2) include the following:

$Si(OCH_3)_4$,
$Si(OCH_2CH_3)_4$,
$Si(OCH_2CH_2CH_3)_4$,
$Si(OCH_2CH_2CH_2CH_3)_4$,
$CH_3Si(OCH_3)_3$,
$CH_3Si(OCH_2CH_3)_3$,
$CH_3Si(OCH_2CH_2CH_3)_3$,
$CH_3Si(OCH_2CH_2CH_2CH_3)_3$,
$(CH_3)_2Si(OCH_3)_2$,
$(CH_3)_2Si(OCH_2CH_3)_2$,
$(CH_3)_2Si(OCH_2CH_2CH_3)_2$,

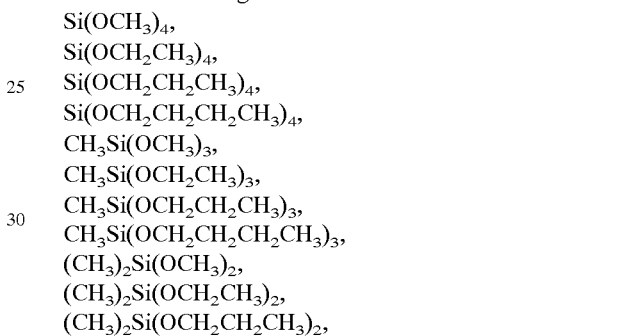

Of these, $Si(OCH_3)_4$, $Si(OCH_2CH_3)_4$, $CH_3Si(OCH_3)_3$, $CH_3Si(OCH_2CH_3)_3$, $(CH_3)_2Si(OCH_3)_2$, $(CH_3)_2Si(OCH_2CH_3)_2$, and partial hydrolyzates thereof are preferred.

When the above-described hydrolyzable silane (A) or a partial hydrolyzate thereof is mixed with the hydrolyzable silane (B) having formula (2) or a partial hydrolyzate thereof, the proportions are 5 to 200 parts by weight, and preferably 10 to 150 parts by weight, of the hydrolyzable silane (B) or a partial hydrolyzate thereof per 100 parts by weight of the hydrolyzable silane (A) or a partial hydrolyzate thereof. An amount of hydrolyzable silane (B) or a partial hydrolyzate thereof greater than 200 parts detracts from the stability of the ink composition under alkaline conditions.

The hydrolysis of above hydrolyzable silanes (A) and (B), or their respective partial hydrolyzates, to give the organosilicon compound serving as a primary component of the inventive ink composition is carried out using as the solvent primarily water, although organic solvents soluble in water, such as alcohols, esters, ketones, or glycols, may be added and used together with the water, if necessary. Organic solvents suitable for this purpose include alcohols such as methanol, ethanol, 1-propanol, and 2-propanol; esters such as methyl acetate, ethyl acetate, and ethyl acetoacetate; ketones such as acetone and methyl ethyl ketone; and glycols such as glycerol and diethylene glycol.

The amount of solvent used for this purpose is preferably 400 to 5,000 parts by weight, and especially 1,000 to 3,000 parts by weight, per 100 parts by weight of the starting silanes. An amount of solvent less than 400 parts by weight would allow the reaction to proceed too far, as a result of which a homogeneous system may not be obtained. Moreover, the storage stability of the final liquid ink composition tends to worsen. On the other hand, the use of more than 5,000 parts by weight is economically unjustified.

The amount of water in the solvent is preferably such that the molar ratio of water to the starting silanes is from 5 to 50. At a molar ratio lower than 5, hydrolysis would not readily proceed to completion, and the liquid ink composition obtained has a poor stability. On the other hand, a ratio higher than 50 is not cost-effective.

Any of a number of methods may be suitably used to carry out the reaction, including methods wherein (1) the silane mixture is added dropwise to water or an organic solvent containing at least the amount of water required for hydrolysis; (2) water is added dropwise, either to the silane mixture or to the silane mixture containing an organic solvent; (3) hydrolyzable silane (B) or a partial hydrolyzate thereof is added dropwise to water or an organic solvent containing at least the amount of water required for hydrolysis, following which hydrolyzable silane (A) or a partial hydrolyzate thereof is added dropwise; and (4) hydrolyzable silane (A) or a partial hydrolyzate thereof is added dropwise to water or an organic solvent containing the amount of water required for hydrolysis, following which hydrolyzable silane (B) or a partial hydrolyzate thereof is added dropwise. Reaction method (1) is especially preferable for assuring the stability of the water resistant ink composition.

Next, organosilicon compound (D) used as component (II) in the water resistant ink compositions according to the other aspect of the invention is described. This is prepared by hydrolyzing a mixture comprising (i) 100 parts by weight of an aminated organic group-bearing hydrolyzable silane of above general formula (1), or a partial hydrolyzate thereof, and (B) 5 to 200 parts by weight, and preferably 10 to 150 parts by weight, of a hydrolyzable silane of above general formula (2), or a partial hydrolyzate thereof to give a hydrolyzate, then reacting this hydrolyzate with the above-described organic monoepoxy compound (ii).

The components (i), (B), and (ii) used here are defined and exemplified as discussed earlier, and both the method used to hydrolyze components (i) and (B) or their respective partial hydrolyzates, as well as the reaction sequence, may be the same as those described above. In addition, when organic monoepoxy compound (ii) is reacted with the hydrolyzate obtained from silanes (i) and (B), the organic monoepoxy compound is used here as well in an amount corresponding to a range of 0.01 to 20 moles, and preferably 0.1 to 10 moles, of epoxy groups per mole of nitrogen atoms in the hydrolyzate. This reaction may be carried out by the same method as described earlier, in which an organic monoepoxy compound is reacted with an aminated organic group-bearing hydrolyzable silane of formula (1), or a partial hydrolyzate thereof.

Organosilicon compounds (C) and (D) are each obtained in the form of an aqueous solution. However, if necessary, the amount of water may be adjusted within a range of 10 to 2,000 parts by weight, and especially 10 to 1,000 parts by weight, per 100 parts by weight of organosilicon compound (C) or (D) by the further addition or removal of water.

The resulting component (II) has a good storage stability in water-based inks, and can itself remain stable even when the system is alkaline due to the component (I) dye. Moreover, it confers water resistance to the ink, in addition to which it does not discolor the dye, thus giving the ink composition an excellent color stability.

The optimal amount of component (II) included in the water resistant ink composition of the invention varies depending on the type of water-soluble dye compound and/or organic pigment compound used as component (I), with component (II) being used in an amount of 2 to 60 parts by weight, and preferably 10 to 40 parts by weight, per 10 parts by weight of component (I). At less than 2 parts by weight, the water resistant effect is too small, whereas the use of more than 60 parts by weight fails to yield any further improvement in water resistance and is undesirable in terms of cost.

Component (III) in the inventive compositions is water, which serves as the solvent for components (I) and (II).

The amount of water included in the ink compositions of the invention is from 30 to 10,000 parts by weight, and preferably from 40 to 1,000 parts by weight, per 10 parts by weight of component (I). At less than 30 parts by weight, the storage stability of the water resistant ink composition worsens, whereas the use of more than 10,000 parts by weight ruins the image quality, making it impossible to obtain the desired image.

The ink compositions of the present invention comprising above components (I) to (III) have excellent water resistance, storage stability, ink discharge stability, and color development, and are thus highly suitable for use in ink-jet printing and other recording methods that rely on water-based inks. Various additives may also be included in the compositions, if necessary.

For example, a humectant may be added to prevent clogging of the nozzles in the printing system and to increase ink discharge stability. Examples of suitable humectants include glycerol, diethylene glycol, triethylene glycol, low-molecular-weight polyethylene glycol, polyvinyl alcohol, ethanol, and isopropanol. Any one or combinations of two or more of these may be used.

When the humectant is included in the inventive ink compositions, use in an amount of 1 to 40 parts by weight, and especially 5 to 30 parts by weight, per 10 parts by weight of component (I) is preferred. The use of less than 1 part by weight may result in an inferior ink discharge stability, whereas use in an amount greater than 40 parts by weight would lower the water resistance and be unnecessarily expensive.

Other optional ingredients may be suitably added insofar as the stability and other desirable properties of the ink composition are not adversely affected. Examples of such optional ingredients include additives for conferring various properties, including ultraviolet stabilizers, anti-foaming agents, and surfactants. Also, a variety of microparticulate inorganic oxides or sols thereof, water-soluble polymers or the like may be added for the purpose of reinforcement.

In addition to providing printed characters and images having excellent water resistance, other desirable features of the inventive ink compositions include good storage stability, color stability, and ink discharge stability, as well as excellent color development of the printed images.

EXAMPLE

Synthesis examples, examples of the invention, and comparative examples are given below by way of illustration, and are not intended to limit the invention.

Synthesis Example 1

A 200-ml reactor fitted with a stirrer, a thermometer, and a condenser was charged with 100 g (0.56 mol) of $(CH_3O)_3SiCH_2CH_2CH_2NH_2$, which was then heated to 80° C. under stirring. Next, 62.2 g (0.84 mol) of 2,3-epoxy-1-propanol was added dropwise over a period of 1 hour, after which the resulting mixture was stirred at 80° C. for 5 hours, causing the amino groups and the epoxy groups to react. The low fraction was removed by distillation under a vacuum of 10 mmHg at 80° C., giving a hydrolyzable silane (A-1) having the characteristics shown below.

$^1$H-NMR Spectral Analysis: ≡Si—C$\underline{H}_2$— 1.0 ppm (d, 2H) ≡Si—CH$_2$C$\underline{H}_2$CH$_2$— 2.0 ppm (m, 2H) CH$_2$CH$_2$C$\underline{H}_2$N$\underline{H}$C$\underline{H}_2$—C$\underline{H}$O—Si 2.8–3.2 ppm (m, 4H) CH$_2$

| $^1$H-NMR Spectral Analysis: | |
|---|---|
| ≡Si—C$\underline{H}_2$— | 1.0 ppm (d, 2H) |
| Si—CH$_2$C$\underline{H}_2$CH$_2$— | 2.0 ppm (m, 2H) |
| CH$_2$CH$_2$C$\underline{H}_2$NHC$\underline{H}_2$—C$\underline{H}_3$O—Si | 2.8–3.2 ppm (m, 4H) |
| CH$_2$C$\underline{H}$CH$_2$O$\underline{H}$<br>\|<br>O$\underline{H}$ | 3.6–4.2 ppm (m, 14H) |
| —N$\underline{H}$— | 1.4 ppm (broad, 1H) |

C$\underline{H}_2$O$\underline{H}$ 3.6–4.2 ppm (m, 14H) —N$\underline{H}$— 1.4 ppm (broad, 1H)

IR Spectral Analysis: 3350 cm$^{-1}$: OH stretching vibrations

This data confirms that the primary amino group was modified as follows:

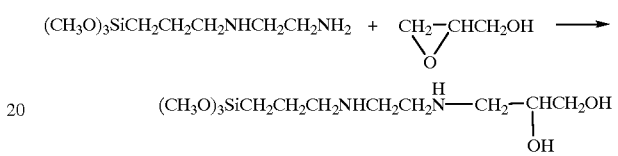

Synthesis Example 2

A 200-ml reactor fitted with a stirrer, a thermometer, and a condenser was charged with 100 g (0.45 mol) of $(CH_3O)_3SiCH_2CH_2CH_2NHCH_2CH_2NH_2$, which was then heated to 80° C. under stirring. Next, 50.3 g (0.68 mol) of 2,3-epoxy-1-propanol was added dropwise over a period of 1 hour, after which the resulting mixture was stirred at 80° C. for 5 hours, causing the amino groups and the epoxy groups to react. The low fraction was removed by distillation under a vacuum of 10 mmHg at 80° C., giving a hydrolyzable silane (A-2) having the characteristics shown below.

$^1$H-NMR Spectral Analysis: ≡Si—C$\underline{H}_2$— 0.7 ppm (d, 2H) Si—CH$_2$C$\underline{H}_2$CH$_2$— 1.6 ppm (m, 2$\overline{H}$) CH$_2$CH$_2$C$\underline{H}_2$NH CH$_{2CH_2}$NHC$\underline{H}_2$—C$\underline{H}_3$O—Si 2.3–2.8 ppm (m, 8H) C$\overline{H}_2$

| $^1$H-NMR Spectral Analysis: | |
|---|---|
| ≡Si—C$\underline{H}_2$— | 0.7 ppm (d, 2H) |
| Si—CH$_2$C$\underline{H}_2$CH$_2$— | 1.6 ppm (m, 2H) |
| CH$_2$CH$_2$C$\underline{H}_2$NHC$\underline{H}_2$CH$_2$NHC$\underline{H}_2$—C$\underline{H}_3$O—Si | 2.3–2.8 ppm (m, 18H) |
| CH$_2$C$\underline{H}$CH$_2$O$\underline{H}$<br>\|<br>O$\underline{H}$ | 3.6–4.2 ppm (m, 14H) |
| —N$\underline{H}$CH$_2$CH$_2$N$\underline{H}$— | 1.2 ppm (broad, 2H) |

C$\underline{H}_2$O$\underline{H}$ 3.6–4.2 ppm (m, 14H) —N$\underline{H}$CH$_2$CH$_2$N$\underline{H}$— 1.2 ppm (broad, 2H)

IR Spectral Analysis: 3340 cm$^{-1}$: OH stretching vibrations

This data confirms that the primary amino group was modified as follows:

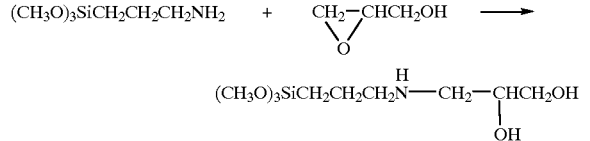

Synthesis Example 3

A 200-ml reactor fitted with a stirrer, a thermometer, and a condenser was charged with 120 g (6.67 mol) of water. With stirring, a mixture of 50.6 g (0.2 mol) of the hydrolyzable silane A-1 obtained in Synthesis Example 1 and 13.6 g (0.1 mol) of $CH_3Si(OCH_3)_3$ was added dropwise to the reactor at room temperature over a period of 10 minutes, whereupon the temperature within the reactor rose from 25° C. to 36° C. The reactor contents were then additionally heated to a temperature of 60 to 70° C. on an oil bath, and stirred for one hour under the same conditions. Next, an ester adapter was attached, the temperature within the reactor was raised to 98° C., and the methanol by-product was removed, yielding 152 g of an aqueous solution of an organosilicon compound. This solution had a non-volatiles content (at 105° C. for 3 hours) of 25.3%.

Synthesis Example 4

A 200-ml reactor fitted with a stirrer, a thermometer, and a condenser was charged with 120 g (6.67 mol) of water. With stirring, a mixture of 50.6 g (0.2 mol) of the hydrolyzable silane A-1 obtained in Synthesis Example 1 and 15.2 g (0.1 mol) of $Si(OCH_3)_4$ was added dropwise to the reactor at room temperature over a period of 10 minutes, whereupon the temperature within the reactor rose from 25° C. to 36° C. The reactor contents were then additionally heated to a temperature of 60 to 70° C. on an oil bath, and stirred for one hour under the same conditions. Next, an ester adapter was attached, the temperature within the reactor was raised to 98° C., and the methanol by-product was removed, yielding 146 g of an aqueous solution of an organosilicon compound. This solution had a non-volatiles content (at 105° C. for 3 hours) of 26.3%.

Synthesis Example 5

A 200-ml reactor fitted with a stirrer, a thermometer, and a condenser was charged with 120 g (6.67 mol) of water. With stirring, a mixture of 59.2 g (0.2 mol) of the hydrolyzable silane A-2 obtained in Synthesis Example 2 and 13.6 g (0.1 mol) of $CH_3Si(OCH_3)_3$ was added dropwise to the reactor at room temperature over a period of 10 minutes, whereupon the temperature within the reactor rose from 25°

C. to 36° C. The reactor contents were then additionally heated to a temperature of 60 to 70° C. on an oil bath, and stirred for one hour under the same conditions. Next, an ester adapter was attached, the temperature within the reactor was raised to 98° C., and the methanol by-product was removed, yielding 157 g of an aqueous solution of an organosilicon compound. This solution had a non-volatiles content (at 105° C. for 3 hours) of 25.0%.

Synthesis Example 6

A 200-ml reactor fitted with a stirrer, a thermometer, and a condenser was charged with 120 g (6.67 mol) of water. With stirring, a mixture of 59.2 g (0.2 mol) of the hydrolyzable silane A-2 obtained in Synthesis Example 2 and 15.2 g (0.1 mol) of $Si(OCH_3)_4$ was added dropwise to the reactor at room temperature over a period of 10 minutes, whereupon the temperature within the reactor rose from 25° C. to 36° C. The reactor contents were then additionally heated to a temperature of 60 to 70° C. on an oil bath, and stirred for one hour under the same conditions. Next, an ester adapter was attached, the temperature within the reactor was raised to 98° C., and the methanol by-product was removed, yielding 151 g of an aqueous solution of an organosilicon compound. This solution had a non-volatiles content (at 105° C. for 3 hours) of 26.0%.

Synthesis Example 7

A 200-ml reactor fitted with a stirrer, a thermometer, and a condenser was charged with 120 g (6.67 mol) of water. With stirring, a mixture of 44.4 g (0.2 mol) of $H_2NCH_2CH_2NHCH_2CH_2CH_2Si(OCH_3)_3$ and 13.6 g (0.1 mol) of $CH_3Si(OCH_3)_3$ was added dropwise to the reactor at room temperature over a period of 10 minutes, whereupon the temperature within the reactor rose from 25° C. to 55° C. The reactor contents were then additionally heated to a temperature of 60 to 70° C. on an oil bath, and stirred for one hour under the same conditions. This was followed by the dropwise addition of 16.3 g (0.22 mol) of 2,3-epoxy-1-propanol over a period of 15 minutes, then another hour of stirring. Next, an ester adapter was attached, the temperature within the reactor was raised to 95° C., and the methanol by-product was removed, yielding 163 g of an aqueous solution of an organosilicon compound. This solution had a non-volatiles content (at 105° C. for 3 hours) of 29.0%.

Synthesis Example 8

A 200-ml reactor fitted with a stirrer, a thermometer, and a condenser was charged with 120 g (6.67 mol) of water. With stirring, a mixture of 41.2 g (0.2 mol) of $H_2NCH_2CH_2NHCH_2CH_2CH_2Si(CH_3)(OCH_3)_2$ and 12.0 g (0.1 mol) of $(CH_3)_2Si(OCH_3)_2$ was added dropwise to the reactor at room temperature over a period of 10 minutes, whereupon the temperature within the reactor rose from 25° C. to 46° C. The reactor contents were then additionally heated to a temperature of 60 to 70° C. on an oil bath, and stirred for one hour under the same conditions. This was followed by the dropwise addition of 16.3 g (0.22 mol) of 2,3-epoxy-1-propanol over a period of 15 minutes, then another hour of stirring. Next, an ester adapter was attached, the temperature within the reactor was raised to 95° C., and the methanol by-product was removed, yielding 170 g of an aqueous solution of an organosilicon compound. This solution had a non-volatiles content (at 105° C. for 3 hours) of 31.0%.

In the following examples, dye trade names: Chlorazol Black LF, Acid Yellow 23, and Acid Blue 92 are available from Tokyo Kasei K. K., and Acid Red 14 is available from Aldrich Chemical Co., Inc.; and the organosilicon compounds prepared in Synthesis Examples 3 to 8 are designated Organosilicon compounds SE3 to SE8, respectively.

Example 1

Black Ink

Components (1) to (4) below were mixed together to give a water resistant ink composition.
(1) Water-soluble dye compound: Chlorazol Black LF, 5.0 g
(2) Organosilicon compound SE3, 19.7 g (solids, 5.0 g)
(3) water, 65.3 g
(4) Humectant: Glycerol, 10.0 g Magenta Ink:

Components (1) to (4) below were mixed together to give a water resistant ink composition.
(1) Water-soluble dye compound: Acid Red 14, 5.0 g
(2) Organosilicon compound SE3, 19.7 g (solids, 5.0 g)
(3) Water, 65.3 g
(4) Humectant: Glycerol, 10.0 g Yellow Ink Components (1) to (4) below were mixed together to give a water resistant ink composition.
(1) Water-soluble dye compound: Acid Yellow 23, 5.0 g
(2) Organosilicon compound SE3, 19.7 g (solids, 5.0 g)
(3) Water, 65.3 g
(4) Humectant: Glycerol, 10.0 g Cyan Ink Components (1) to (4) below were mixed together to give a water resistant ink composition.
(1) Water-soluble dye compound: Acid Blue 92, 5.0 g
(2) Organosilicon compound SE3, 19.7 g (solids, 5.0 g)
(3) Water, 65.3 g
(4) Humectant: Glycerol, 10.0 g Ink-jet printing was carried out on plain paper with a Canon BJC-600S ink-jet printer using these four different-colored ink compositions. The printed images were evaluated as described below. The results are shown in Table 1.

Water Resistance

The degree of change in the printed image was evaluated after first immersing in water the sheet of paper that had been ink-jet printed as described above, then drawing the sheet out of the water.

Good: No change

Fair: Slight bleeding due to water

Poor: Considerable bleeding due to water

Color Development of the Image

The color development of the printed image formed on paper by ink-jet printing was evaluated.

Good: Good color development

Poor: Poor color development

Discharge Stability

Printed images formed after one hour of continuous printing were examined for the presence or absence of skipping due to clogging of the nozzle discharge orifices with ink.

Good: No skipping

Fair: Some skipping

Poor: Severe skipping

Storage Stability

This test consisted of determining the number of days that printing could be carried out without adverse changes when the printer was used continuously for 30 minutes per day. The results given in the table indicate the period until the nozzles clogged or skipping arose on the printed image.

60° C. Shelf Stability

The ink composition was left to stand at 60° C., and changes in the liquid were evaluated. The results shown in the table indicate the period during which the composition was stable; that is, the length of time until a change in color, gelation, or some other effect arose in the liquid.

Example 2

Black Ink

Components (1) to (4) below were mixed together to give a water resistant ink composition.
(1) Water-soluble dye compound: Chlorazol Black LF, 5.0 g
(2) Organosilicon compound SE4, 19.0 g (solids, 10.0 g)
(3) Water, 66.0 g
(4) Humectant: Glycerol, 10.0 g Magenta Ink Components (1) to (4) below were mixed together to give a water resistant ink composition.
(1) Water-soluble dye compound: Acid Red 14, 5.0 g
(2) Organosilicon compound SE4, 19.0 g (solids, 10.0 g)
(3) Water, 66.0 g
(4) Humectant: Glycerol, 10.0 g Yellow Ink Components (1) to (4) below were mixed together to give a water resistant ink composition.
(1) Water-soluble dye compound: Acid Yellow 23, 5.0 g
(2) Organosilicon compound SE4, 19.0 g (solids, 10.0 g)
(3) Water, 66.0 g
(4) Humectant: Glycerol, 10.0 g Cyan Ink Components (1) to (4) below were mixed together to give a water resistant ink composition.
(1) Water-soluble dye compound: Acid Blue 92, 5.0 g
(2) Organosilicon compound SE4, 19.0 g (solids, 10.0 g)
(3) Water, 66.0 g
(4) Humectant: Glycerol, 10.0 g Ink-jet printing was carried out on plain paper with a Canon BJC-600S ink-jet printer using these four different-colored ink compositions. Evaluation was carried out as in Example 1. The results are shown in Table 1.

Example 3

Black Ink

Components (1) to (4) below were mixed together to give a water resistant ink composition.
(1) Water-soluble dye compound: Chlorazol Black LF, 5.0 g
(2) organosilicon compound SE5, 20.0 g (solids, 5.0 g)
(3) Water, 65.0 g
(4) Humectant: Glycerol, 10.0 g Magenta Ink Components (1) to (4) below were mixed together to give a water resistant ink composition.
(1) Water-soluble dye compound: Acid Red 14, 5.0 g
(2) Organosilicon compound SE5, 20.0 g (solids, 5.0 g)
(3) Water, 65.0 g
(4) Humectant: Glycerol, 10.0 g Yellow Ink Components (1) to (4) below were mixed together to give a water resistant ink composition.
(1) Water-soluble dye compound: Acid Yellow 23, 5.0 g
(2) Organosilicon compound SE5, 20.0 g (solids, 5.0 g)
(3) Water, 65.0 g
(4) Humectant: Glycerol, 10.0 g Cyan Ink Components (1) to (4) below were mixed together to give a water resistant ink composition.
(1) Water-soluble dye compound: Acid Blue 92, 5.0 g
(2) Organosilicon compound SE5, 20.0 g (solids, 5.0 g)
(3) Water, 65.0 g
(4) Humectant: Glycerol, 10.0 g Ink-jet printing was carried out on plain paper with a Canon BJC-600S ink-jet printer using these four different-colored ink compositions. Evaluation was carried out as in Example 1. The results are shown in Table 1.

Example 4

Black Ink

Components (1) to (4) below were mixed together to give a water resistant ink composition.
(1) Water-soluble dye compound: Chlorazol Black LF, 5.0 g
(2) Organosilicon compound SE6, 19.2 g (solids, 5.0 g)
(3) Water, 65.8 g
(4) Humectant: Glycerol, 10.0 g Magenta Ink Components (1) to (4) below were mixed together to give a water resistant ink composition.
(1) Water-soluble dye compound: Acid Red 14, 5.0 g
(2) Organosilicon compound SE6, 19.2 g (solids, 5.0 g)
(3) Water, 65.8 g
(4) Humectant: Glycerol, 10.0 g Yellow Ink Components (1) to (4) below were mixed together to give a water resistant ink composition.
(1) Water-soluble dye compound: Acid Yellow 23, 5.0 g
(2) Organosilicon compound SE6, 19.2 g (solids, 5.0 g)
(3) Water, 65.8 g
(4) Humectant: Glycerol, 10.0 g Cyan Ink Components (1) to (4) below were mixed together to give a water resistant ink composition.
(1) Water-soluble dye compound: Acid Blue 92, 5.0 g
(2) Organosilicon compound SE6, 19.2 g (solids, 5.0 g)
(3) Water, 65.8 g
(4) Humectant: Glycerol, 10.0 g Ink-jet printing was carried out on plain paper with a Canon BJC-600S ink-jet printer using these four different-colored ink compositions. Evaluation was carried out as in Example 1. The results are shown in Table 1.

Example 5

Black Ink

Components (1) to (4) below were mixed together to give a water resistant ink composition.
(1) Water-soluble dye compound: Chlorazol Black LF, 5.0 g
(2) Organosilicon compound SE7, 17.2 g (solids, 5.0 g)
(3) Water, 67.8 g
(4) Humectant: Glycerol, 10.0 g Magenta Ink Components (1) to (4) below were mixed together to give a water resistant ink composition.
(1) Water-soluble dye compound: Acid Red 14, 5.0 g
(2) organosilicon compound SE7, 17.2 g (solids, 5.0 g)
(3) Water, 67.8 g
(4) Humectant: Glycerol, 10.0 g Yellow Ink Components (1) to (4) below were mixed together to give a water resistant ink composition.
(1) Water-soluble dye compound: Acid Yellow 23, 5.0 g
(2) Organosilicon compound SE7, 17.2 g (solids, 5.0 g)
(3) Water, 67.8 g
(4) Humectant: Glycerol, 10.0 g Cyan Ink Components (1) to (4) below were mixed together to give a water resistant ink composition.
(1) Water-soluble dye compound: Acid Blue 92, 5.0 g
(2) organosilicon compound SE7, 17.2 g (solids, 5.0 g)
(3) Water, 67.8 g (4) Humectant: Glycerol, 10.0 g Ink-jet printing was carried out on plain paper with a Canon BJC-600S ink-jet printer using these four different-colored ink compositions. Evaluation was carried out as in Example 1. The results are shown in Table 1.

Example 6

Black Ink

Components (1) to (4) below were mixed together to give a water resistant ink composition.
(1) Water-soluble dye compound: Chlorazol Black LF, 5.0 g
(2) Organosilicon compound SE8, 16.1 g (solids, 5.0 g)
(3) Water, 68.9 g
(4) Humectant: Glycerol, 10.0 g Magenta Ink Components (1) to (4) below were mixed together to give a water resistant ink composition.
(1) Water-soluble dye compound: Acid Red 14, 5.0 g
(2) organosilicon compound SE8, 16.1 g (solids, 5.0 g)
(3) Water, 68.9 g
(4) Humectant: Glycerol, 10.0 g Yellow Ink Components (1) to (4) below were mixed together to give a water resistant ink composition.
(1) Water-soluble dye compound: Acid Yellow 23, 5.0 g
(2) Organosilicon compound SE8, 16.1 g (solids, 5.0 g)
(3) Water, 68.9 g
(4) Humectant: Glycerol, 10.0 g Cyan Ink Components (1) to (4) below were mixed together to give a water resistant ink composition.
(1) Water-soluble dye compound: Acid Blue 92, 5.0 g
(2) Organosilicon compound SE8, 16.1 g (solids, 5.0 g)
(3) Water, 68.9 g
(4) Humectant: Glycerol, 10.0 g Ink-jet printing was carried out on plain paper with a Canon BJC-600S ink-jet printer using these four different-colored ink compositions. Evaluation was carried out as in Example 1. The results are shown in Table 1.

Comparative Example 1

Ink-jet printing was carried out on plain paper with a Canon BJC-600S ink-jet printer using the inks supplied with the printer. Evaluation was carried out as in Example 1. The results are shown in Table 1.

Comparative Example 2

Ink-jet printing was carried out on plain paper with an Epson MJ-500C ink-jet printer using the inks supplied with the printer. Evaluation was carried out as in Example 1. The results are shown in Table 1.

Comparative Example 3

Black Ink

Components (1) to (4) below were mixed together to give a water resistant ink composition.
(1) Water-soluble dye compound: Chlorazol Black LF, 5.0 g
(2) Pentaethylenehexamine, 5.0 g
(3) Water, 80.0 g
(4) Humectant: Glycerol, 10.0 g Magenta Ink Components (1) to (4) below were mixed together to give a water resistant ink composition.
(1) Water-soluble dye compound: Acid Red 14, 5.0 g
(2) Pentaethylenehexamine, 5.0 g
(3) Water, 80.0 g
(4) Humectant: Glycerol, 10.0 g Yellow Ink Components (1) to (4) below were mixed together to give a water resistant ink composition.
(1) Water-soluble dye compound: Acid Yellow 23, 5.0 g
(2) Pentaethylenehexamine, 5.0 g
(3) Water, 80.0 g
(4) Humectant: Glycerol, 10.0 g Cyan Ink Components (1) to (4) below were mixed together to give a water resistant ink composition.
(1) Water-soluble dye compound: Acid Blue 92, 5.0 g
(2) Pentaethylenehexamine, 5.0 g
(3) Water, 80.0 g
(4) Humectant: Glycerol, 10.0 g Ink-jet printing was carried out on plain paper with a Canon BJC-600S ink-jet printer using these four different-colored ink compositions. Evaluation was carried out as in Example 1. The results are shown in Table 1.

Comparative Example 4

Black Ink

Components (1) to (4) below were mixed together to give a water resistant ink composition.
(1) Water-soluble dye compound: Chlorazol Black LF, 5.0 g
(2) Triethylenepentamine, 5.0 g
(3) Water, 80.0 g
(4) Humectant: Glycerol, 10.0 g Magenta Ink Components (1) to (4) below were mixed together to give a water resistant ink composition.
(1) Water-soluble dye compound: Acid Red 14, 5.0 g
(2) Triethylenepentamine, 5.0 g
(3) Water, 80.0 g
(4) Humectant: Glycerol, 10.0 g Yellow Ink Components (1) to (4) below were mixed together to give a water resistant ink composition.
(1) Water-soluble dye compound: Acid Yellow 23, 5.0 g
(2) Triethylenepentamine, 5.0 g
(3) Water, 80.0 g
(4) Humectant: Glycerol, 10.0 g Cyan Ink Components (1) to (4) below were mixed together to give a water resistant ink composition.
(1) Water-soluble dye compound: Acid Blue 92, 5.0 g
(2) Triethylenepentamine, 5.0 g
(3) Water, 80.0 g
(4) Humectant: Glycerol, 10.0 g Ink-jet printing was carried out on plain paper with a Canon BJC-600S ink-jet printer using these four different-colored ink compositions. Evaluation was carried out as in Example 1. The results are shown in Table 1.

TABLE 1

| | Water resistance | Image color development | Discharge stability | Storage stability | 60° C. Shelf stability |
|---|---|---|---|---|---|
| Ex. 1 | good | good | good | 6 months | 12 months |
| Ex. 2 | good | good | good | 6 months | 12 months |
| Ex. 3 | good | good | good | 6 months | 12 months |
| Ex. 4 | good | good | good | 6 months | 12 months |
| Ex. 5 | good | good | good | 6 months | 12 months |
| Ex. 6 | good | qood | good | 6 months | 12 months |
| Comp. Ex. 1 | poor | good | good | 6 months | 12 months |
| Comp. Ex. 2 | poor | good | good | 6 months | 12 months |
| Comp. Ex. 3 | fair | poor | fair | 1 month | color changed after 3 days |
| Comp. Ex. 4 | fair | poor | fair | 1 month | color changed after 3 days |

The water resistant ink compositions according to the present invention not only have excellent water resistance, they also have good storage stability, good ink discharge stability and, in particular, outstanding color stability.

Japanese Patent Application No. 67936/1998 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A water resistant ink composition comprising:

(I) 10 parts by weight of a water-soluble dye compound or an organic pigment compound or both;

(II) 2 to 60 parts by weight of an organosilicon compound (C) obtained by hydrolyzing a mixture comprising (A) 100 parts by weight of a hydrolyzable silane obtained by reacting (i) an aminated organic group-bearing hydrolyzable silane of the general formula:

$$YR^1_m SiR^2_{3-m} \quad (1)$$

wherein $R^1$ is an unsubstituted or substituted monovalent hydrocarbon group having 1 to 8 carbons, $R^2$ is an alkoxy or acyloxy group having 1 to 4 carbons, Y is an aminated organic group, and m is 0 or 1, with (ii) an organic monoepoxy alcohol in an amount corresponding to from 0.01 to 20 moles of epoxy groups per mole of amino groups in the hydrolyzable silane, or a partial hydrolyzate thereof, and (B) 5 to 200 parts by weight of a hydrolyzable silane of the general formula:

$$R^3_n SiR^4_{4-n} \quad (2)$$

wherein $R^3$ is an unsubstituted or a non-nitrogenous substituted monovalent hydrocarbon group having 1 to 8 carbons, $R^4$ is an alkoxy or acyloxy group having 1 to 4 carbons, and n is 0, 1 or 2, or a partial hydrolyzate thereof; and (III) 30 to 10,000 parts by weight of water.

2. The water resistant ink composition of claim 1, wherein the aminated organic group-bearing hydrolyzable silane of formula (1) is selected from the group consisting of H₂NCH₂CH₂NHCH₂CH₂CH₂Si(OCH₃)₃

-continued
H₂NCH₂CH₂NHCH₂CH₂CH₂Si(OCH₂CH₃)₃

H₂NCH₂CH₂NHCH₂CH₂CH₂Si(OCH₃)₂ with CH₃

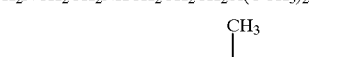
H₂NCH₂CH₂NHCH₂CH₂CH₂Si(OCH₂CH₃)₂ with CH₃

H₂NCH₂CH₂CH₂Si(OCH₃)₃

H₂NCH₂CH₂CH₂Si(OCH₂CH₃)₃

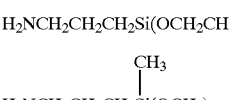
H₂NCH₂CH₂CH₂Si(OCH₃)₂ with CH₃ and

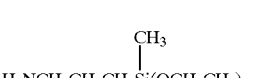
H₂NCH₂CH₂CH₂Si(OCH₂CH₃)₂ with CH₃.

3. The water resistant ink composition of claim 1, wherein the organic monoepoxy alcohol is of the general formula:

(4)

wherein $R^9$ is a divalent organic group; and $R^{10}$ is a hydroxyl group.

4. A water resistant ink composition of claim 3, wherein the aminated organic group-bearing hydrolyzable silane of formula (1) is selected from the group consisting of H₂NCH₂CH₂NHCH₂CH₂CH₂Si(OCH₃)₃

H₂NCH₂CH₂NHCH₂CH₂CH₂Si(OCH₂CH₃)₃

H₂NCH₂CH₂NHCH₂CH₂CH₂Si(OCH₃)₂ with CH₃

H₂NCH₂CH₂NHCH₂CH₂CH₂Si(OCH₂CH₃)₂ with CH₃

H₂NCH₂CH₂CH₂Si(OCH₃)₃

H₂NCH₂CH₂CH₂Si(OCH₂CH₃)₃

H₂NCH₂CH₂CH₂Si(OCH₃)₂ with CH₃ and

-continued

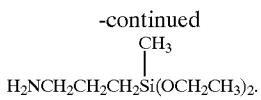

5. The water resistant ink composition of claim 4, wherein the hydrolyzable silane of formula (2) is selected from the group consisting of Si(OCH$_3$)$_4$, Si(OCH$_2$CH$_3$)$_4$, CH$_3$Si(OCH$_3$)$_3$, CH$_3$Si(OCH$_2$CH$_3$)$_3$, (CH$_3$)$_2$Si(OCH$_3$)$_2$, and (CH$_3$)$_2$Si(OCH$_2$CH$_3$)$_2$.

6. The water resistant ink composition of claim 3, wherein the hydrolyzable silane of formula (2) is selected from the group consisting of Si(OCH$_3$)$_4$, Si(OCH$_2$CH$_3$)$_4$, CH$_3$Si(OCH$_3$)$_3$, CH$_3$Si(OCH$_2$CH$_3$)$_3$, (CH$_3$)$_2$Si(OCH$_3$)$_2$, and (CH$_3$)$_2$Si(OCH$_2$CH$_3$)$_2$.

7. The water resistant ink composition of claim 3, further comprising 1 to 40 parts by weight of a humectant.

8. In a method of ink-jet printing using a water resistant ink composition the improvement wherein said water resistant ink composition is a composition of claim 3.

9. A composition according to claim 3, wherein R$^1$ and R$^3$ are each alkyl, alkenyl, aryl, aralkyl, or halogenated alkyl; Y is an aminated organic group of formula (3)

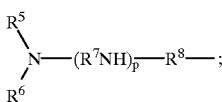

(3)

R$^5$ and R$^6$ are each independently hydrogen or a monovalent hydrocarbon group having 1 through 8 carbon atoms;

R$^7$ and R$^8$ are each independently a divalent hydrocarbon group having 1 to 8 carbon atoms; and p is zero or integer from 1 to 3.

10. A composition according to claim 9, wherein R$^5$ and R$^6$ are each independently hydrogen or alkyl, alkenyl, aryl, aralkyl or halogenated alkyl; and R$^7$ and R$^8$ are each independently an alkylene having up to 8 carbon atoms.

11. A composition according to claim 3, wherein R$^9$ is alkylene or alkenylene group having 1–25 carbon atoms and which optionally has one or more intervening oxygen atoms in the chain.

12. A composition according to claim 11, wherein R$^9$ is —CH$_2$— or —CH$_2$CH$_2$—.

13. A water resistant ink composition according to claim 3, wherein said monoepoxy alcohol is

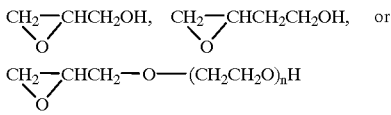

and n is 1 to 10.

14. The water resistant ink composition of claim 1, wherein the hydrolyzable silane of formula (2) is selected from the group consisting of Si(OCH$_3$)$_4$, Si(OCH$_2$CH$_3$)$_4$, CH$_3$Si(OCH$_3$)$_3$, CH$_3$Si(OCH$_2$CH$_3$)$_3$, (CH$_3$)$_2$Si(OCH$_3$)$_2$, and (CH$_3$)$_2$Si(OCH$_2$CH$_3$)$_2$.

15. The water resistant ink composition of claim 1, further comprising 1 to 40 parts by weight of a humectant.

16. In a method of ink-jet printing using a water resistant ink composition the improvement wherein said water resistant ink composition is a composition of claim 1.

17. A water resistant ink composition comprising:
(I) 10 parts by weight of a water-soluble dye compound or an organic pigment compound or both;
(II) 2 to 60 parts by weight of an organosilicon compound
(D) obtained by reacting a hydrolyzate afforded by the hydrolysis of a mixture comprising
(i) 100 parts by weight of an aminated organic group-bearing hydrolyzable silane of the general formula:

(1)

wherein R$^1$ is an unsubstituted or substituted monovalent hydrocarbon group having 1 to 8 carbons, R$^2$ is an alkoxy or acyloxy group having 1 to 4 carbons, Y is an aminated organic group, and m is 0 or 1, or a partial hydrolyzate thereof, and (B) 5 to 200 parts by weight of a hydrolyzable silane of the general formula:

(2)

wherein R$^3$ is an unsubstituted or a non-nitrogenous substituted monovalent hydrocarbon group having 1 to 8 carbons, R$^4$ is an alkoxy or acyloxy group having 1 to 4 carbons, and n is 0, 1 or 2, or a partial hydrolyzate thereof, with (ii) an organic monoepoxy alcohol in an amount corresponding to from 0.01 to 20 moles of epoxy groups per mole of amino groups in said hydrolyzate obtained from silanes (i) and (B), and (III) 30 to 10,000 parts by weight of water.

18. The water resistant ink composition of claim 17, wherein the aminated organic group-bearing hydrolyzable silane of formula (1) is selected from the group consisting of H$_2$NCH$_2$CH$_2$NHCH$_2$CH$_2$CH$_2$Si(OCH$_3$)$_3$ H$_2$NCH$_2$CH$_2$NHCH$_2$CH$_2$CH$_2$Si(OCH$_2$CH$_3$)$_3$

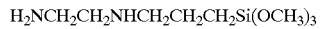

H$_2$NCH$_2$CH$_2$NHCH$_2$CH$_2$CH$_2$Si(OCH$_3$)$_2$

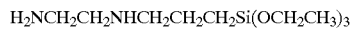

H$_2$NCH$_2$CH$_2$NHCH$_2$CH$_2$CH$_2$Si(OCH$_2$CH$_3$)$_2$

H$_2$NCH$_2$CH$_2$CH$_2$Si(OCH$_3$)$_3$

H$_2$NCH$_2$CH$_2$CH$_2$Si(OCH$_2$CH$_3$)$_3$

H$_2$NCH$_2$CH$_2$CH$_2$Si(OCH$_3$)$_2$ and

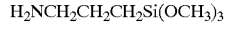

H$_2$NCH$_2$CH$_2$CH$_2$Si(OCH$_2$CH$_3$)$_2$.

19. The water resistant ink composition of claim 17, wherein the organic monoepoxy alcohol is of the general formula:

(4)

wherein R$^9$ is a divalent organic group; and R$^{10}$ is a hydroxyl group.

20. The water resistant ink composition of claim 19, wherein the aminated organic group-bearing hydrolyzable silane of formula (1) is selected from the group consisting of

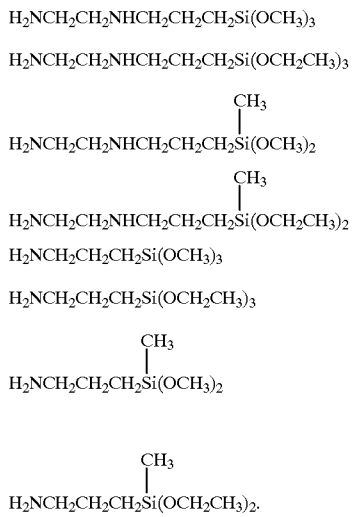

21. The water resistant ink composition of claim 20, wherein the hydrolyzable silane of formula (2) is selected from the group consisting of $Si(OCH_3)_4$, $Si(OCH_2CH_3)_4$, $CH_3Si(OCH_3)_3$, $CH_3Si(OCH_2CH_3)_3$, $(CH_3)_2Si(OCH_3)_2$, and $(CH_3)_2Si(OCH_2CH_3)_2$.

22. The water resistant ink composition of claim 19, wherein the hydrolyzable silane of formula (2) is selected from the group consisting of $Si(OCH_3)_4$, $Si(OCH_2CH_3)_4$, $CH_3Si(OCH_3)_3$, $CH_3Si(OCH_2CH_3)_3$, $(CH_3)_2Si(OCH_3)_2$, and $(CH_3)_2Si(OCH_2CH_3)_2$.

23. The water resistant ink composition of claim 19, further comprising 1 to 40 parts by weight of a humectant.

24. In a method of ink-jet printing using a water resistant ink composition the improvement wherein said water resistant ink composition is a composition of claim 19.

25. A composition according to claim 19, wherein $R^1$ and $R^3$ are each alkyl, alkenyl, aryl, aralkyl, or halogenated alkyl;

Y is an aminated organic group of formula (3)

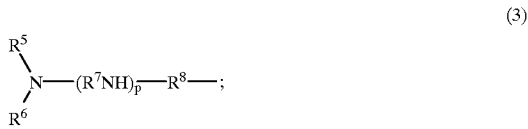

$R^5$ and $R^6$ are each independently hydrogen or a monovalent hydrocarbon group having 1 through 8 carbon atoms;
$R^7$ and $R^8$ are each independently a divalent hydrocarbon group having 1 to 8 carbon atoms; and
p is zero or integer from 1 to 3.

26. A composition according to claim 25, wherein $R^5$ and $R^6$ are each independently hydrogen or alkyl, alkenyl, aryl, aralkyl or halogenated alkyl; and $R^7$ and $R^8$ are each independently an alkylene having up to 8 carbon atoms.

27. A composition according to claim 19, wherein $R^9$ is alkylene or alkenylene group having 1–25 carbon atoms and which optionally has one or more intervening oxygen atoms in the chain.

28. A composition according to claim 27, wherein $R^9$ is $—CH_2—$ or $—CH_2CH_2—$.

29. A water resistant ink composition according to claim 19, wherein said monoepoxy alcohol is

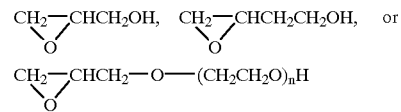

and n is 1 to 10.

30. The water resistant ink composition of claim 17, wherein the hydrolyzable silane of formula (2) is selected from the group consisting of $Si(OCH_3)_4$, $Si(OCH_2CH_3)_4$, $CH_3Si(OCH_3)_3$, $CH_3Si(OCH_2CH_3)_3$, $(CH_3)_2Si(OCH_3)_2$, and $(CH_3)_2Si(OCH_2CH_3)_2$.

31. The water resistant ink composition of claim 17, further comprising 1 to 40 parts by weight of a humectant.

32. In a method of ink-jet printing using a water resistant ink composition the improvement wherein said water resistant ink composition is a composition of claim 17.

* * * * *